Figure 16:
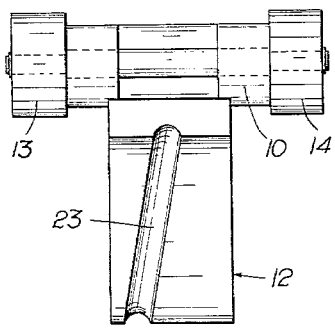

Aug. 10, 1965 A. WÖGERBAUER 3,199,175
METHOD AND APPARATUS FOR THE CONTINUOUS MANUFACTURE OF
ZIGZAG-SHAPED STRUTTING FOR LATTICE STRUCTURES AND OF
LIGHTWEIGHT STRUCTURES COMPRISING SUCH STRUTTING
Filed July 1, 1963 6 Sheets-Sheet 1
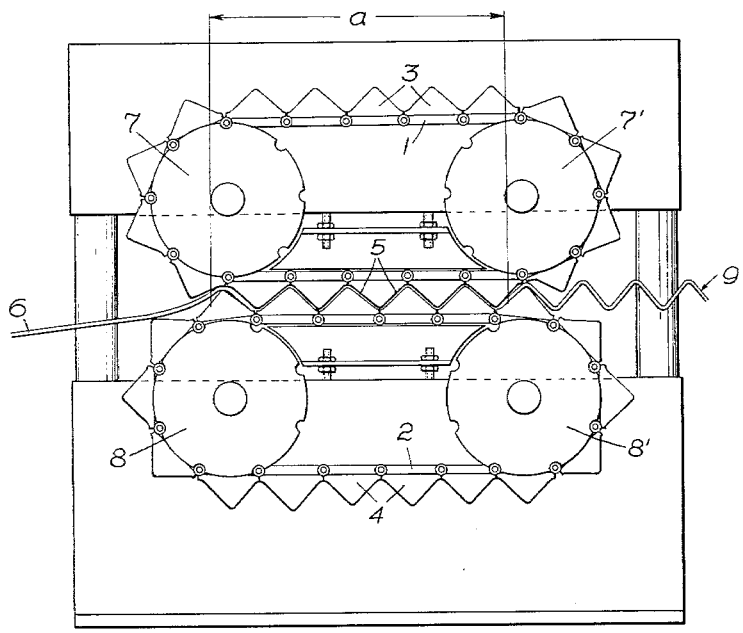
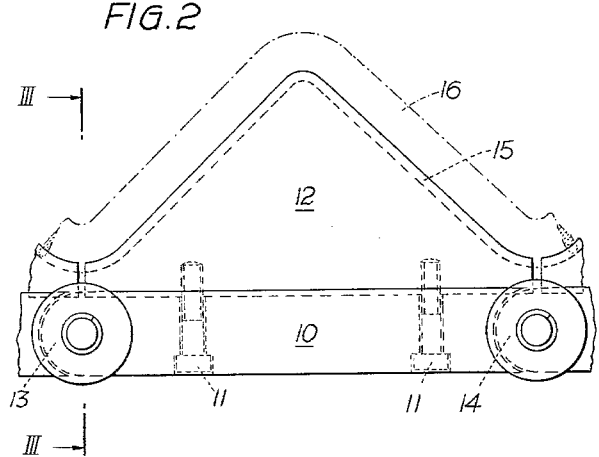 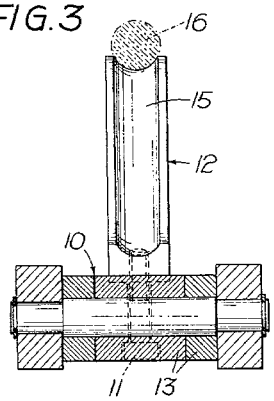
INVENTOR.
ALFRED WOGERBAUER
BY
HIS ATTORNEYS

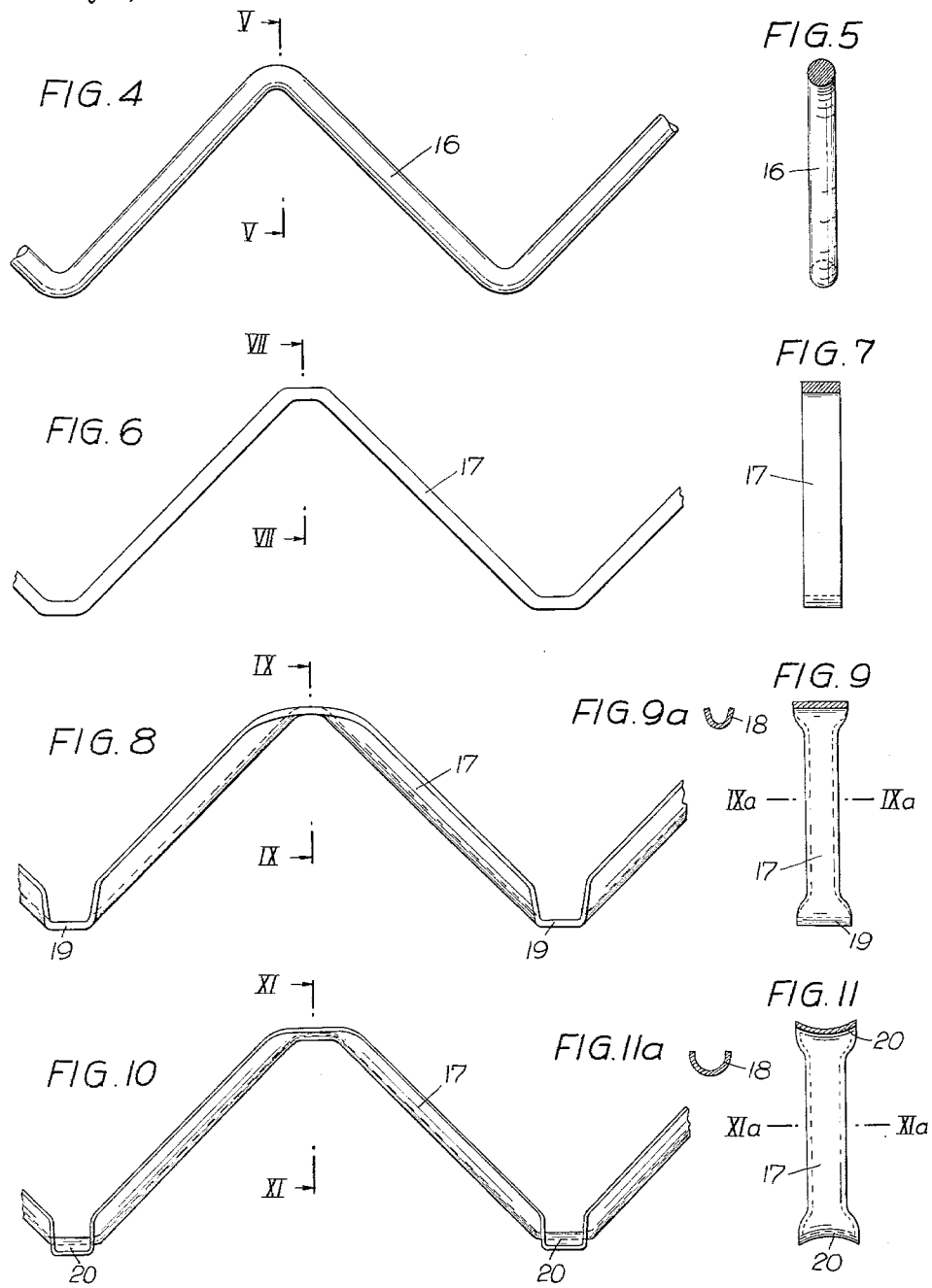

Aug. 10, 1965 A. WÖGERBAUER 3,199,175
METHOD AND APPARATUS FOR THE CONTINUOUS MANUFACTURE OF
ZIGZAG-SHAPED STRUTTING FOR LATTICE STRUCTURES AND OF
LIGHTWEIGHT STRUCTURES COMPRISING SUCH STRUTTING
Filed July 1, 1963 6 Sheets-Sheet 5

INVENTOR.
ALFRED WOGERBAUER
BY
HIS ATTORNEYS

INVENTOR.
ALFRED WOGERBAUER
BY
HIS ATTORNEYS

United States Patent Office 3,199,175
Patented Aug. 10, 1965

3,199,175
METHOD AND APPARATUS FOR THE CONTINUOUS MANUFACTURE OF ZIGZAG-SHAPED STRUTTING FOR LATTICE STRUCTURES AND OF LIGHTWEIGHT STRUCTURES COMPRISING SUCH STRUTTING
Alfred Wögerbauer, Linz (Danube), Austria, assignor to Vereinigte Österreichische Eisen- und Stahlwerke Aktiengesellschaft, Linz, Austria, a company of Austria
Filed July 1, 1963, Ser. No. 291,984
Claims priority, application Austria, July 6, 1962, 5,472/62
13 Claims. (Cl. 29—155)

This invention relates to the manufacture of zigzag-shaped strutting for lattice structures, which strutting is made from a deformable elongated starting material, particularly from bar steel or strip steel, and of lightweight structures comprising such strutting.

Lightweight structures such as pylons, masts, roof bents, joists or the like are usually made by inserting zigzag-shaped strutting between chords (upper and lower chords) of suitable section. Because bent strutting has previously been made in a discontinuous operation, the insertion of the strutting between the chords had also to be effected in a discontinuous manner (in most cases by riveting or welding) so that the manufacture was expensive and such plants had only a small output.

It is an object of the invention to enable a continuous manufacture of said zigzag-shaped strutting for lattice structures and of the corresponding lightweight structures, and the invention resides in that the strip or bar stock is passed through between meshing triangular bending tools which are continuously moved along a portion of the forming station, and the resulting zigzag-shaped strutting is then connected to chords to form a lightweight lattice structure, if desired.

In a preferred embodiment of the invention, two series of bending tools are moved along the forming station with the aid of two revolving endless carrying chains, one series of bending tools being staggered by half the chain pitch relative to the other series so that the working faces of the tools mesh while leaving a forming gap. The triangular bending tools mesh like the teeth of a spur gear train and the approaching starting material is bent by a lower tool around the tip of the succeeding upper tool and by an upper tool about the tip of the succeeding lower tool. During this operation at least one strut angle consisting of two struts formed into final shape is held between the advancing tools so that the lattice structure will be reliably given exactly the desired dimensions with respect to pitch and height.

In a special development of the invention, the strip or bar stock is given a zigzag shape and the individual struts of the strutting are additionally shaped, for instance, to increase the resistance of the strutting to buckling. For this purpose the strip or bar stock passed through between the bending tools may be additionally shaped in planes extending at right angles to the direction of movement of the stock; for instance, a strip material may be given a trough shape. This additional shaping (profiling) at right angles to the direction of movement of the material may be effected before, during or after the movement of the material through the zigzag forming station. When the profiling of the struts is effected simultaneously, during the movement through the zigzag forming station, the working faces of the bending tools must be formed like punches and dies. In many cases, however, it may be desirable to effect the additional shaping of the material bent to a zigzag shape in a stamping press, which succeeds the zigzag forming station and has revolving profiling tools.

If the zigzag-shaped strutting made as described hereinbefore is to be connected to other parts of a lightweight structure, e.g., by being welded between the chords of a roof bent, it will be desirable to shape the corners of the strutting bent to zigzag shape so as to form connecting portions, so-called nodes, which are, for instance, trough-shaped or concave, in order to facilitate the welding.

According to another embodiment of the invention the zigzag-shaped strutting for the lattice structure may be made with struts which are laterally angled relative to each other. Struts laterally angled relative to each other will enable lateral forces to be taken up by the lattice structure and may resist a lateral yielding of a chord.

According to further embodiments of the invention, a plurality of lines of zigzag-shaped strutting may be made simultaneously and lines of zigzag-shaped strutting differing in height and pitch may be made at the same time.

The method according to the invention and the apparatus for carrying out the method are further explained in the drawing.

Figure 17:
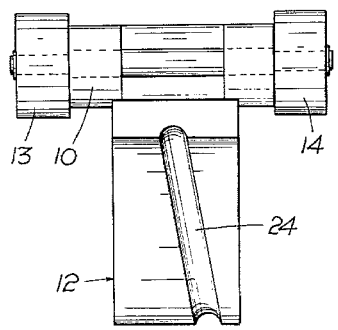
Figure 12:
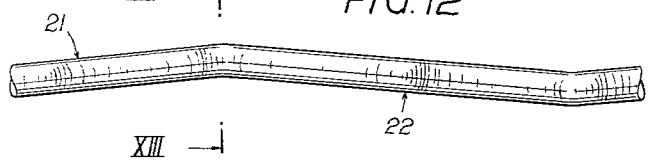
Figure 13:
Figure 18:
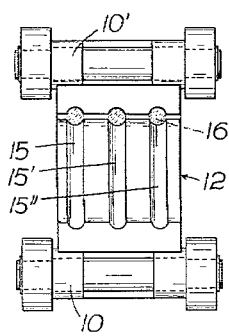
Figure 23:
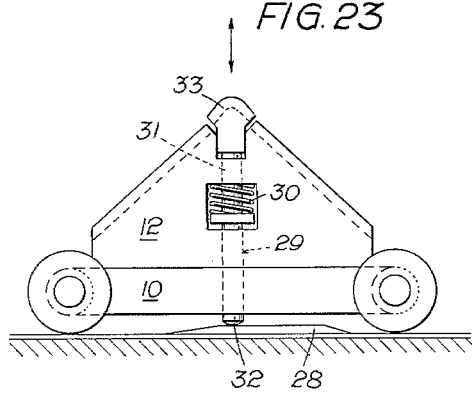
Figure 21:
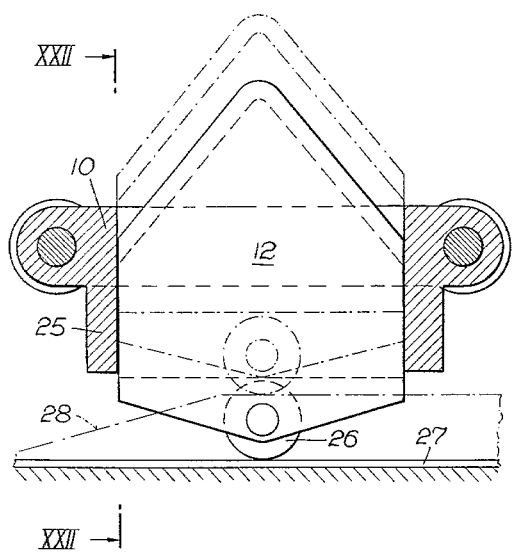
Figure 22:
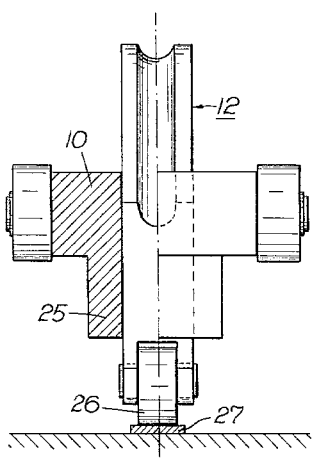
Figure 19:
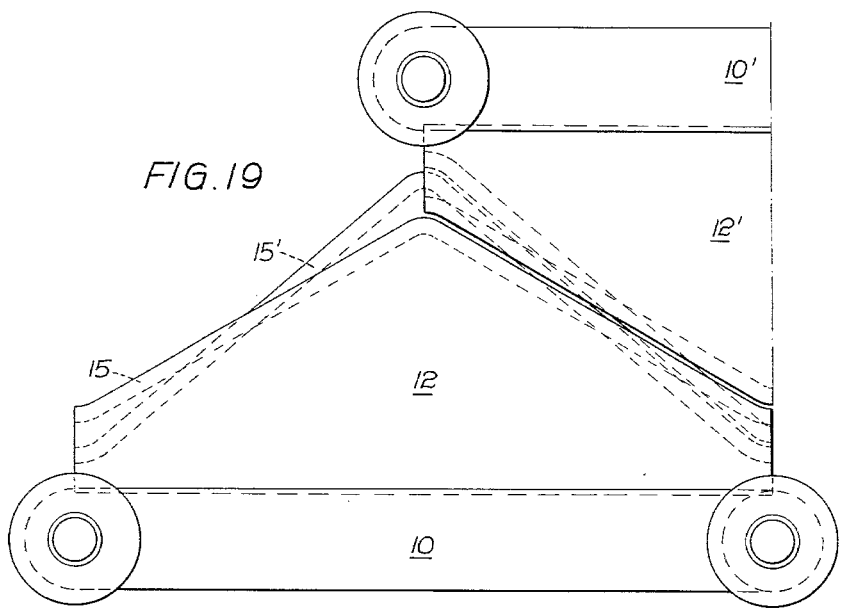
Figure 20:
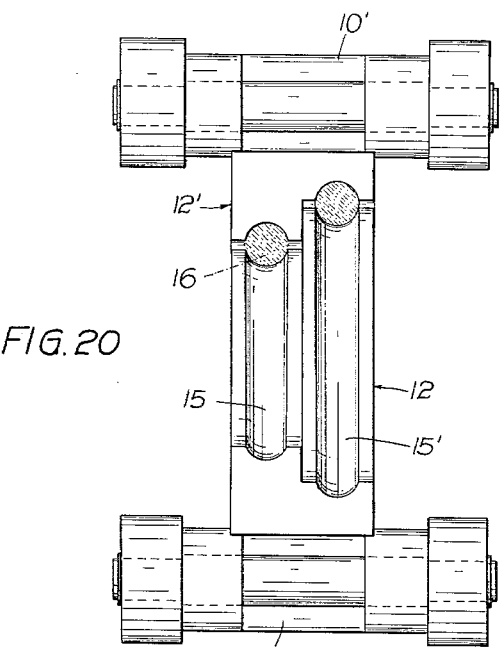
Figure 24:
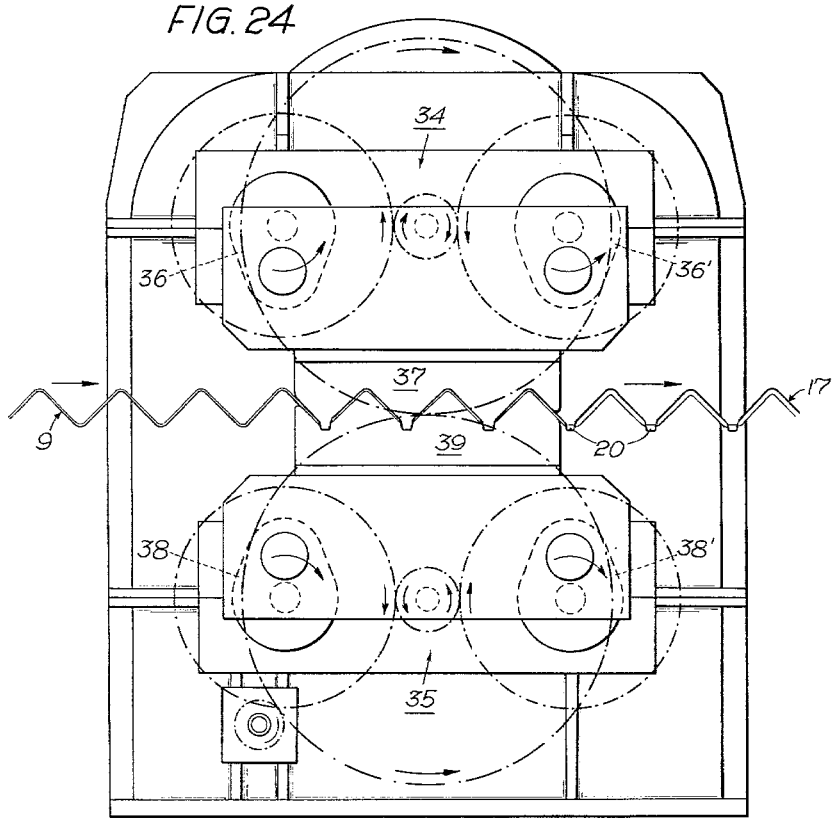
Figure 25:
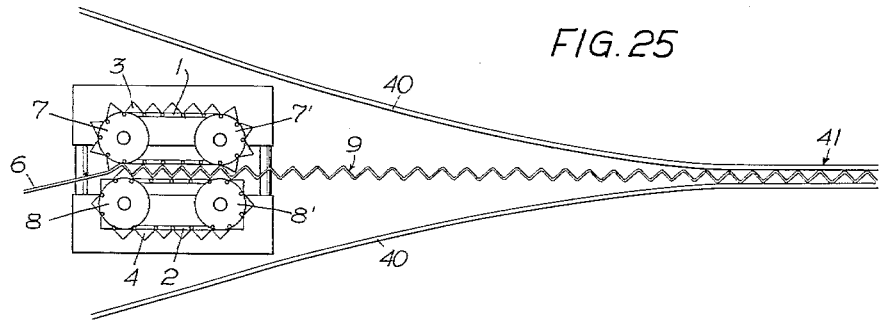

FIG. 1 is a diagrammatic view showing an apparatus for the continuous manufacture of zigzag-shaped strutting for a lattice structure. FIGS. 2 and 3, respectively, are front and side elevations showing an individual chain link and a tool for bending round-section bar stock. FIGS. 4 are 5 show strutting made from round-section bar stock by the method according to the invention. FIGS. 6 and 7 show strutting made from flat-section stock. FIGS. 8, 9 and 9a are similar views showing strutting made by bending flat-section stock to zigzag shape and having struts which have been additionally shaped to resist buckling. FIGS. 10, 11 and 11a are similar views showing zigzag-shaped strutting comprising struts which have been additionally shaped to resist buckling and corner portions specially shaped to form connecting portions, so-called nodes. FIGS. 12 and 13, respectively, are a top plan view and a front elevation showing strutting made by bending round-section bar stock to zigzag-shape and having struts laterally angled relative to each other. FIGS. 14 to 17 show chain links with tools suitable for making struts laterally angled relative to each other from round-section bar stock. FIG. 18 shows a chain link having a tool for the simultaneous manufacture of three zigzag-shaped lines of strutting. FIGS. 19 and 20, respectively, are side and front elevations showing the arrangement of tools for the simultaneous or alternating manufacture of zigzag-shaped strutting having different heights but an even node spacing, from round-section bar stock. FIGS. 21 and 22, respectively, are a side elevation and a sectional view showing a chain link with a movable tool for making acute-angled strutting. FIG. 23 shows a chain link with a tool, the tip of which acts on the connecting portion (node) of the struts transversely to the direction of movement of the chain. FIG. 24 shows a stamping press which succeeds the zigzag forming station and serves for additionally shaping the individual struts. Finally, FIG. 25 is a diagrammatic representation of the general arrangement, wherein zigzag-shaped strutting manufacture in accordance with the invention is continuously brought together with and connected to an upper and lower chord.

In FIG. 1, 1 is a revolving upper carrying chain and 2 a revolving lower carrying chain. The carrying chains consist of swivel links and carry series of bending tools 3 and 4, which are relatively staggered by half the chain pitch so that the tools mesh like the teeth of a spur gear train and their working faces define a forming gap 5, through which the starting material 6 (round section bar stock or flat-section stock) to be formed is passed. Each carrying chain moves around two chain sprockets 7, 7' and 8, 8'. The lower carrying chain is preferably driven whereas the upper one is idling. As is apparent from the drawing, the triangular bending tools advance continuously along the forming station so that the starting material 6 is also bent in a continuous manner to form zigzag-shaped strutting 9. Along the forming station, the length of which is indicated at *a* in FIG. 1, at least one complete strut angle consisting of two successive struts is held between the advancing tools so that the specified or desired dimensions will be exactly obtained.

In FIGS. 2 and 3, 10 designates a chain link, to which the triangular bending tool 12 is secured by screws 11. 13 and 14 are the joint-forming elements for connection to the next chain link. The working surface of the tool 12 has the shape of a semicircular groove 15, which cooperates with a corresponding groove of the mating tool to receive the round-section bar stock.

FIGS. 4 and 5 show the zigzag-shaped strutting made from round-section bar stock 16 with the tools shown in FIGS. 2 and 3. FIGS. 6 and 7 are similar views showing flat-section stock 17.

FIGS. 8 and 9 show an embodiment of the invention in which zigzag-shaped strutting of flat-section stock 17 has been additionally shaped in a plane extending at right angles to the direction of movement of the stock. By a trough-shaped lower tool (die) and a convex upper tool (punch), the stock is given a trough-shaped profile 18 throughout the length of the struts, as is evident from FIG. 9*a*, whereas the corners of the strutting are shaped to form flat connecting portions (nodes) 19. The embodiment shown in FIGS. 10, 11 and 11*a* is somewhat modified. The struts in this case have also a trough-shaped profile 18 (FIG. 11*a*), because the tools form a punch and die whereas the connecting portions 20 are concave.

As has already been mentioned, FIGS. 12 and 13 show zigzag-shaped strutting made from round-section bar material, the successive struts 21, 22 of which are laterally angled so as to include an obtuse angle with each other. Such a laterally angled strutting may be made with tools as shown in FIGS. 14 to 17. Again, numeral 10 designates the chain links, numerals 13 and 14 designate the swivel elements for connecting the chain links, and numeral 12 designates the triangular tool body. This tool body 12 is formed with machined trough-shaped grooves 23, 24, which include with each other in the direction of movement of the stock the desired obtuse angle by which the struts are to be laterally angled.

Figure 14:
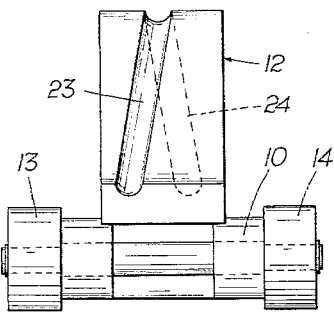
Figure 15:
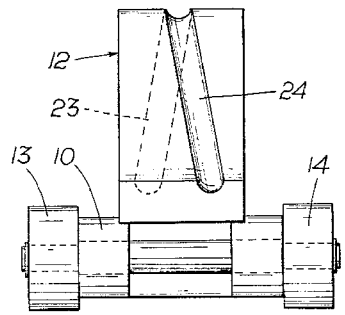

FIGS. 14 and 15 show the links of the lower carrying chain 2. FIGS. 16 and 17 show the links of the upper carrying chain 1.

The bending tools of the upper and lower carrying chain shown in mesh in FIG. 18 enable the simultaneous manufacture of three lines of zigzag-shaped strutting from round-section bar stock. 10 is the chain link of the lower tool and 10′ that of the upper tool. The tool bodies 12 have three parallel grooves 15, 15′ and 15″ and shape the bar stock to obtain three lines of zigzag-shaped strutting 16 moving one beside the other.

Whereas FIGS. 19 and 20 show also multiple-action or multiple tools, these are used for making lines of zigzag-shaped strutting of different height. Such multiple tools will preferably be used when struts of different heights are to be made in alternation without an exchange of tools. This is required, for instance, for making joists of different height. The tool bodies of the upper tool and of the lower tool are offset in steps and are formed in the steps with machined grooves 15, 15′ spaced different distances apart from the chain link 10. Tool chains differing in pitch may be replaced one for the other to make lines of strutting different in pitch by one plant.

The apparatus described hereinbefore enables the manufacture of zigzag-shaped strutting in which two adjacent struts include an angle of 90° or more. The making of strutting having acute angles would involve the difficulty that the outgoing zigzag-shaped strutting does not clear the tool but is subjected to deforming pressure by the tip of the tool. To overcome this difficulty, the invention proposes for the manufacture of zigzag-shaped strutting having an angle smaller than 90° to extend the tool transversely to the direction of movement of the stock before it engages the stock with deformation and to retract the tool before it is pivotally moved away from the stock. For this purpose, the tools or parts of them are arranged to be movable at right angles to the direction of movement of the stock to be formed. This is shown in more detail in FIGS. 21 and 22. In this embodiment the tool body 12 is capable of being lifted and lowered along slide faces 25 in the chain link 10 and the tool body 12 moves along rollers 26 on guide rails 27, which have cams 28 engaged by the rollers 26 before the tools engage the stock with deformation and disengaged by the rollers before the chain link is pivotally moved away from the stock. In other respects, the tool is similar to that shown in FIGS. 2 and 3 but the bending angle is acute.

The same principle may be adopted for a deeper deformation of certain portions of the zigzag-shaped strutting, for instance, to give the connecting portions (nodes) for connection to parts of a lightweight structure the shape of a trough having a flat or concave bottom. Such an embodiment is shown in FIG. 23. The tool body 12 has a central bore 29, which accommodates a punch 31 which is loaded by a spring 30. The movement of the punch is also controlled by cams 28 in slidable engagement with the rounded end 32 of the punch 31.

The head 33 of the punch may be flat or curved to give the connecting portions the shape shown in FIGS. 8 to 11. The cams 28 are relatively short so that the punch will not be operated until the struts adjoining the node to be formed have been shaped and act as a backing. The head of the punch is urged back by the spring before the tool is pivotally moved out of its working position.

For transmitting a drive to the revolving carrying chains, one side of the chain links may form a rack in mesh with a pinion. Other drive means may be used, as will easily be understood by a person skilled in the art.

FIG. 24 illustrates that embodiment of the invention in which a stamping press succeeds the zigzag forming station. The stamping press shown in the drawing comprises two tool carriers 34 and 35. The upper tool 37 is mounted by means of cranks 36, 36′ on the upper tool carrier 34 and the lower tool 39 is mounted by means of cranks on the lower tool carrier 35. This mounting ensures that the tools will be parallel in any position. The stock 9 bent to a zigzag shape in the forming station is introduced between the upper and lower tools. The working faces of the tools form a punch and die so that the corners of the strutting are shaped to form connecting portions 20 when engaged by the tools. The crank radius depends on the length of the portion to be shaped during each revolution of the crank. It will be understood that the peripheral velocity of the cranks must be selected to match the velocity of the strip. All four cranks are desirably interconnected by a transmission to ensure their synchronous movement.

When the zigzag-shaped strutting has been made in the manner illustrated in FIG. 1, it may be connected to parts of a lattice structure, preferably to trough-shaped chords, to form a complete lattice structure. This is illustrated in FIG. 25. The zigzag-shaped strutting 9 leaving the forming station is continuously combined with an upper and a lower chord 40, by moving the chords from opposite sides toward the strutting and into contact with the corners of the strutting, which corners have preferably the form of connecting portions 20, as is evident from FIG. 24. The connection is desirably made by electric resistance welding. The final lattice structure is indicated at 41.

What I claim is:

1. A method for the continuous manufacture of zigzag-shaped strutting for lattice structures from elongated metallic material selected from strip and bar stock, comprising passing said elongated material through between two series of meshing triangular bending tools of a forming station to form zigzag-shaped strutting, each series of said triangular bending tools being mounted on a revolving endless carrying chain continuously moved along the forming station, one series of bending tools being staggered by half the pitch of the chains relative to the other series so that the tools mesh while leaving a forming gap and additionally shaping said metallic material in planes extending at right angles to the direction of movement of the strip material.

2. A method for the continuous manufacture of zigzag-shaped strutting for lattice structures from elongated metallic material selected from strip and bar stock, comprising passing said elongated material through and between two series of meshing triangular bending tools of a forming station to form zigzag-shaped strutting, each series of said triangular bending tools being mounted on a revolving endless carrying chain continuously moved along the forming station, one series of bending tools being staggered by half the pitch of the chains relative to the other series so that the tools mesh while leaving a forming gap and additionally shaping said strutting in a stamping press which succeeds the bending tools and has revolving profiling tools to shape the apices of the zigzag-shaped strutting to form so-called nodes, i.e. portions adapted to be connected to structural strip elements.

3. A method for the continuous manufacture of a lightweight lattice structure including zigzag-shaped strutting, comprising passing elongated metallic material selected from strip and bar stock through between two series of meshing triangular bending tools of a forming station, each series of said triangular bending tools being mounted on a revolving endless carrying chain continuously moved along the forming station, one series of bending tools being staggered by half the pitch of said chains relative to the other series so that the working faces of the tools mesh while leaving a forming gap, then moving two chords towards the resulting zigzag-shaped strutting from opposite sides thereof and into contact with the apices of said strutting and connecting the chords to said apices by welding.

4. An apparatus for the continuous manufacture of zigzag-shaped strutting for lattice structures from elongated metallic material, comprising two series of triangular bending tools, each tool having multiple die shapes thereby imparting multiple action and adapted to bend at least two strips simultaneously, said strips being beside each other between the multiple action triangular bending tools which are continuously moved along a portion of a forming station to form lines of strutting differing in height and bend angle, said tools being carried by carrying chains and relatively staggered by half the chain pitch and mesh so as to leave a zigzag-shaped forming gap.

5. An apparatus as set forth in claim 4 wherein said carrying chains are endless and extend around sprockets and one carrying chain is driven whereas the other is idling.

6. An apparatus for the continuous manufacture of zigzag-shaped strutting for lattice structures from elongated metallic material, comprising two series of triangular bending tools which are carried by chains each movable in an endless path and said tools being relatively staggered by half the chain pitch and mesh so as to leave a zigzag-shaped forming gap, the upper and lower tools having opposed working faces defining the opposite sides of said gap and said working faces being profiled complementally to form punches and dies, respectively, for bending material passed through said gap between said tools into a zigzag shape and for additionally shaping said material in planes extending at right angles to the direction of movement of the chains.

7. An apparatus as set forth in claim 6 wherein the working face of each punch is convex and the working face of each die is concave so that they include a trough-shaped forming gap.

8. An apparatus as set forth in claim 6 wherein the tools consist of multiple tools for shaping a plurality of strips one beside the other.

9. An apparatus as set forth in claim 6 wherein each upper tool has a punch which is movable at right angles to the direction of movement of the material and is spring loaded and operable in position of engagement for a deeper deformation of the corners of the strutting.

10. An apparatus as set forth in claim 6 wherein the tool bodies of tools intended for acute bend angles are movable at right angles to the direction of movement of the material and their movement is controlled by cams.

11. An apparatus for the continuous manufacture of zigzag-shaped strutting for lattice structures from elongated metallic material, comprising two series of triangular bending tools which are carried by carrying chains and relatively staggered by half the chain pitch and mesh so as to leave a zigzag-shaped forming gap, and a stamping press succeeding the two series of triangular bending tools and comprising crank-operated upper and lower tools the working faces of which constitute a punch and die, respectively, for a deeper deformation of the corners of the zigzag-shaped strutting.

12. A method for the continuous manufacture of zigzag-shaped strutting for lattice structures from elongated metallic material selected from strip and bar stock, comprising passing at least two strips of said elongated material one beside the other between meshing triangular bending tools which are continuously moved along a portion of a forming station to form lines of strutting differing in height and bend angle.

13. A method for the continuous manufacture of zigzag-shaped strutting for lattice structures from elongated metallic material selected from strip and bar stock, comprising passing said elongated material between meshing triangular bending tools which are continuously moved along a portion of a forming station to form zigzag-shaped strutting having relatively inclined struts and bending said strip material transversely to angle the struts of the strutting laterally relative to each other in the direction of movement, during the passage of the elongated material through the bending tools.

References Cited by the Examiner

UNITED STATES PATENTS

| | | | |
|---|---|---|---|
| 493,860 | 3/93 | Fay | 113—42.5 |
| 1,727,894 | 9/29 | Moyer | 153—68 |
| 2,148,914 | 2/39 | Terhaar | 153—77 |
| 2,662,272 | 12/53 | Macomber | 29—155 |
| 3,064,694 | 5/61 | Brook et al. | 140—105 |
| 3,104,454 | 9/63 | Handley et al. | 29—155 |

WHITMORE A. WILTZ, *Primary Examiner.*

THOMAS H. EAGER, *Examiner.*